United States Patent [19]

Simons

[11] Patent Number: 5,227,040
[45] Date of Patent: Jul. 13, 1993

[54] HIGH PERFORMANCE BIPOLAR MEMBRANES

[75] Inventor: Raymond G. Simons, Rose Bay, Australia

[73] Assignee: Unisearch Limited, New South Wales, Australia

[21] Appl. No.: 781,660

[22] Filed: Oct. 25, 1991

Related U.S. Application Data

[63] Continuation of Ser. No. 472,566, Jan. 30, 1990, abandoned.

[30] Foreign Application Priority Data

Jul. 30, 1987 [AU] Australia ............................ PI3430
May 17, 1988 [AU] Australia ............................ PI8266

[51] Int. Cl.$^5$ ............................................. C25B 13/00
[52] U.S. Cl. .................................... 204/295; 204/296; 204/301; 521/27; 521/30
[58] Field of Search ............... 204/295, 301, 296; 521/27, 30

[56] References Cited

U.S. PATENT DOCUMENTS 4,140,815  11/1979  Dega et al. .............................. 427/44
4,670,125  7/1987  Mueller et al. ....................... 204/296

FOREIGN PATENT DOCUMENTS 0143582  6/1985  European Pat. Off. .
2122543  1/1984  United Kingdom .

OTHER PUBLICATIONS

Simons "A Novel Method for Preparing Bipolar Membranes" Electrocimica Acta vol 31, No. 9, 1986, pp. 1175–1176.

*Primary Examiner*—John Niebling
*Assistant Examiner*—Arun S. Phasge
*Attorney, Agent, or Firm*—Nixon & Vanderhye

[57] ABSTRACT

A low electrical resistance bipolar membrane formed by the conjoining of treated anion and cation exchange membranes is disclosed. The treatment comprises contacting the membranes with an aqueous solution of at least one cation prior to conjoining and contacting at least one face of the membranes with an aqueous alkaline solution.

A process for the preparation of acid and alkali using these bipolar membranes is also disclosed.

35 Claims, 1 Drawing Sheet

HIGH PERFORMANCE BIPOLAR MEMBRANES

This is a continuation of application Ser. No. 07/472,566, filed Jan. 30, 1990, now abandoned.

FIELD OF THE INVENTION

This invention relates to low electrical resistance bipolar membranes comprising separate anion and cation exchange films, a process for their production and to the use of such membranes for producing acid and alkali.

BACKGROUND ART

Acids and bases are important intermediates for a wide variety of products made by the chemical industry. After processing and use these find their way back to nature as salts. A logical route for completing the cycle would be to regenerate the acids and bases directly from these salts. Electrolysis of brine to generate chlorine and caustic soda, in a certain sense, is such a process. Another process is electrodialysis, using bipolar membranes to directly generate acids and bases from their salts. The process is electrically driven and the splitting of the salt to generate the acid and base occurs in an aqueous medium. The process is conceptually a simple one and can be represented by the equation:

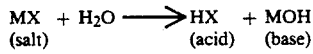

$$\underset{\text{(salt)}}{MX} + H_2O \longrightarrow \underset{\text{(acid)}}{HX} + \underset{\text{(base)}}{MOH}$$

To effect and maintain separation of the various species, ion exchange membranes are used. The most crucial of these is the bipolar membrane, so called because it is composed of two distinct parts which are selective to ions of opposite charges. Under the influence of an applied direct current, such a sandwich membrane is capable of forcibly dissociating water to form equivalent amounts of hydrogen and hydroxyl ions. Used in conjunction with other cation- and anion- selective (i.e., monopolar), membranes, the assembly constitutes a potentially economical water splitting apparatus that generates acid and base.

The standard free energy for a process that converts water to one molar hydrogen and hydroxyl ions at 25° C. is 19,100 cal/mole. For a reversible process, i.e., a process approaching zero current density, this translates to an energy requirement of 0.022 kWh/mole at 25° C. For production of caustic soda this is equivalent to an energy requirement of 500 kWh/ton. An efficient water splitting system is therefore capable of generating acid and base solutions at a fraction of the costs encountered commercially (2800-3500 kWh/ton).

Bipolar membranes can be prepared by many different methods. In U.S. Pat. Nos. 4,024,043 and 4,057,481 (both Dege et al) single film bipolar membranes are prepared from pre-swollen films containing a relatively high amount of an insoluble cross-linked aromatic polymer on which highly dissociable cationic exchange groups are chemically bonded to the aromatic nuclei to a desired depth of the film from one side only; subsequently, highly dissociable anionic exchange groups are chemically bonded to the unreacted aromatic nuclei on the other side of the film.

In Japanese Patent Publication Nos. 78-158638 and 79-7196 (both Tokuyama Soda Co. Ltd.), bipolar membranes are prepared by partially covering a membrane with a cover film, sulfonating the surface of the membrane not in contact with the cover film to introduce cation exchange groups, exfoliating the cover film, and introducing anion exchange groups on the exfoliated surfaces.

Bipolar membranes have also been prepared by bonding together separate anion and cation exchange films or membranes. The two monopolar membranes of opposite selectivity can be fused together with the application of heat and pressure. See, for example, U.S. Pat. No. 3,372,101 by Kollsman wherein separate cation and anion membranes are bonded together in a hydraulic press at 150° C. at a pressure of 400 lb/sq. inch to form a two ply membrane structure.

However, bipolar membranes formed in this way suffer the disadvantage of high electrical resistance produced by the fusion. Furthermore these membranes are prone to bubble or blister and they are operable for only short time periods at relatively low current densities. These disadvantages make the bipolar membranes formed in this way unattractive for commercial electrodialysis operations.

In other relevant prior art, published by the present inventor in Electrochimica Acta, 31(9) 1175-1176 (1986), there is disclosed a method for the preparation of bipolar membranes whereby inorganic electrolyte solutions are brushed onto the faces of suitable anionic and cationic membranes, prior to the faces being pressed together. A variety of electrolyte solutions were found to be effective in facilitating the preparation of potassium hydroxide and hydrochloric acid from a potassium chloride solution. Unfortunately, it was found that membranes only remained effective for a few hours when 1 molar acid and base solutions were separated by a membrane and for a few weeks only when a membrane separated potassium chloride solutions.

DISCLOSURE OF INVENTION

It is therefore an object of the present invention to provide bipolar membranes made from separate anion and cation exchange membranes that are substantially free of the aforementioned disadvantages of the prior art.

It is a further object of this invention to provide a method for preparing low resistance bipolar membranes with a high efficiency for water splitting, by joining together separate anion and cation exchange membranes.

It is another object of this invention to provide a process whereby acid and alkali may be produced by the use of low resistance bipolar membranes.

Accordingly, the present invention in a first aspect consists in a bipolar membrane comprising conjoined anion and cation exchange membranes, wherein said membranes have been treated with:

(a) an aqueous solution of at least one monovalent or higher oxidation state cation, excluding sodium and potassium, prior to being conjoined, and
(b) at least one face of one of the membranes has been treated with an aqueous alkaline solution.

In a second aspect, the present invention consists in a cation exchange membrane for use in forming a bipolar membrane, wherein said membrane has been treated by immersion in an aqueous solution of at least one monovalent or higher oxidation state cation, excluding sodium and potassium.

In a third aspect, the present invention consists in an anion exchange membrane for use in forming a bipolar membrane, wherein said membrane has been treated by immersion in an aqueous solution of at least one monovalent or higher oxidation state cation, excluding sodium and potassium.

In a fourth aspect, the present invention consists in a method for the preparation of a bipolar membrane comprising:

(a) treating an anion exchange membrane and a cation exchange membrane with an aqueous solution of a salt, said salt yielding in the solution at least one monovalent or higher oxidation state cation, excluding sodium and potassium;

(b) conjoining the treated anion and cation exchange membranes; and (c) treating at least one face of the conjoined membranes with an aqueous alkaline solution.

In a fifth aspect, the present invention consists in a method for the preparation of a bipolar membrane comprising treating an anion exchange membrane and a cation exchange membrane with an aqueous alkaline solution of a salt, said salt yielding in the solution at least one monovalent or higher oxidation state cation, excluding sodium and potassium, and conjoining the treated membranes.

In a sixth aspect, the present invention consists in a method for the production of acid and alkali, comprising electrodialysing an aqueous salt solution using a bipolar membrane of the first aspect of the invention.

The present inventor believes that this treatment may either alter or modify the surface properties or structure of the membrane and/or by the introduction of certain species into occlusions in the membrane.

It is preferred that the membranes are treated, prior to conjoining, by immersion in an aqueous solution of at least one monovalent or higher oxidation state cation, excluding potassium and sodium.

In one embodiment, the membranes are treated with the aqueous alkaline solution prior to conjoining. Conveniently, this solution may be combined with the aqueous solution of the at least one monovalent or higher oxidation state cation, excluding potassium and sodium.

In this embodiment, preferably each membrane is boiled in the cation containing solution of high pH. Moderate alkali concentrations, of about 1 molar, have been found to be effective, but lower or higher concentrations may also be utilised, typically in the size of from 0.2 to 2.0 molar.

Suitable metal cations include, but are by no means limited to, for example, $Cr^{6+}$, $Ru^{3+}$, $Ce^{3+}$, $Ni^{2+}$, $Zr^{4+}$, $In^{3+}$ and $Sn^{2+}$.

Suitable cation containing salts include chromic nitrate, ruthenium trichloride, indium sulphate, cerrous sulphate, thorium nitrate and zirconium chloride.

It will be appreciated that the above list of cations is not exhaustive. Further, while single salts may be used, mixtures of salts, and/or different concentrations of such salt(s) may be used.

The anion and cation exchange membranes treated as described herein, are pressed together either at room temperature or else under heat with treated surfaces located at the interface. This heating may be carried out at a temperature in the range from ambient up to a temperature just below the onset of deformation or degradation of the anionic or cationic exchange membranes employed.

Although the inventive membranes of this embodiment have been found to possess a number of advantages over prior art membranes, the preferred method of forming the membranes has two aspects which present some difficulty.

Firstly, a typical alkaline solution containing the selected cation species may splutter on heating and is strongly corrosive. The spluttering is exacerbated by the presence of the membrane and therefore limits the amount of membrane which can be treated in a given volume of solution.

Secondly in the hot alkaline solution, the membranes tend to be carried to the surface of the solution by convection. Thus, there is uncertainty as to whether the entire film surface has been treated. This difficulty would be expected to be more severe with increasing membrane size.

Surprisingly, in order to avoid the two aforementioned aspects of the method of that embodiment, the present inventor has found that alternatively, in a second embodiment, the membranes are treated with an aqueous solution of the selected cation, conjoined and then treated with an aqueous alkaline solution.

The present inventor has found that the membranes of this embodiment may be stored in a sealed container following treatment with the inventive aqueous cation solution. The membranes may then be removed from the container and conjoined to form a bipolar membrane prior to treatment with the aqueous alkaline solution.

The treatment of the cation and anion exchange membranes with the aqueous cation solution is preferably carried out by immersion of the membranes in the solution for an appropriate time. The solution need only be at room temperature, whilst the treatment time may vary from less than thirty minutes to overnight.

Suitable metal cations include, without limitation, $Cr^{3+}$, $Ru^{3+}$, $Ce^{3+}$, $Ni^{2+}$, $Zr^{4+}$, $In^{3+}$, $Sn^{2+}$ and $Fe^{2+}$. These may be present in the form of salts such as chromic nitrate, chromic chloride, ruthenium trichloride, ferrous chloride, indium sulphate, cerrous sulphate, thorium nitrate and zirconium chloride.

A salt concentration of the order of about 5% to 15% has been found to be effective.

It will be appreciated that whilst single salts may be used, mixtures of salts, and/or different concentrations of such salt(s) may be used.

Following treatment with the aqueous cation solution, the membranes are preferably washed with water prior to being conjoined by pressing together either at room temperature or else they may be conjoined under heat at a temperature below the onset of deformation or degradation of the membrane.

Alternatively, after washing, the treated membranes may be stored wet in a sealed container for a period prior to them being joined.

Following conjoining, the membrane is treated with an aqueous alkaline solution, preferably by fitting the membrane into a multi-chamber electrodialysis cell and placing into at least one of the chambers in contact with the membrane, an amount of alkaline solution sufficient to treat the one of the faces of the membrane. This may take place at the point of preparation of the membrane or at the site of use.

Generally, the alkaline solution will be in concentration of about 0.2–2.0 molar at a temperature of about 75° C. for a treatment time of about 15–30 minutes. However, the concentration, temperature of the solution and the treatment time may be varied appropriately.

Following the alkaline treatment, the bipolar membrane is ready for use. If the alkaline treatment has taken place in a cell as described, the alkaline solution may be conveniently replaced by the solution or solutions to be subjected to electrodialysis.

From the foregoing, it will be evident that by carrying out the inventive treatment in two steps, with the alkaline treatment preferably being carried out in an electrodialysis cell, the difficulties of the inventive process of the first embodiment are avoided.

The resulting bipolar membrane consists of three principle regions:

1. The anion exchange membrane: The prime function of the anion exchange membrane is to pass $OH^-$ ions derived from water splitting at the interface and to exclude cations from the external solution.
2. The cation exchange membrane: The prime function of the cation exchange membrane is to pass $H^+$ ions derived from water splitting at the interface and to exclude anions from the external solution.
3. An interfacial section comprising the surface layers of both membranes and the intervening region where they are contiguous: It is in this region that water splitting occurs.

The electrical resistance of the resulting bipolar membrane is generally much smaller than that of a membrane when the component membranes or at least the interface is untreated. A potential difference across the membrane which is 1.0 V or less can be sufficient for a current density of 100 mA cm$^{-2}$ when it separates 1N KCl solutions. The corresponding voltage for a membrane if the component films are untreated is likely to exceed 3 V. In addition the current efficiency for acid base production of treated membranes can be higher than 90%.

A wide variety of anion and cation exchange membranes containing strong acid and strong base groups may be used in the invention but preferably the membranes contain sulphonic acid and quaternary ammonium groups.

The treatment of the membranes according to the invention not only provides a high degree of bonding and adhesion between the anion and cation exchange membranes but, more importantly, provides a much lower electrical resistance for the resulting bipolar membrane than if the membrane or the interface of the component membranes is not treated or was bonded simply by the prior art application of heat and pressure.

From the foregoing, it is evident that there is a fundamental difference between the present invention and the prior art, including the inventor's own published paper and that is the treatment of the membranes in alkaline solution which includes at least one selected cation. It should also be noted that whereas in the inventor's previous disclosure, sodium metasilicate solutions are used, which are inherently alkaline, nevertheless there is no disclosure of the boiling of membranes in alkaline solutions containing at least one selected cation. Moreover, it has been found that boiling in sodium metasilicate solutions containing cations of the invention is not effective in making stable low resistance bipolar membranes which operate satisfactorily when separating one molar acid and base solutions.

BRIEF DESCRIPTION OF THE DRAWINGS

As shown schematically in FIG. 1, a bipolar membrane according to the invention consists of three regions, a cation-selective region 1, an anion-selective region 3, and the interface between these two regions 2. These membranes behave anisotropically under the influence of an electric field as is illustrated by the transport processes shown in FIGS. 1 and 2. FIG. 1 shows that when a direct current is passed across the bipolar membrane with its cation side toward the anode and salt solution on either side, cations and anions are transported to the interface through the permselective membranes, but the passage of ions out of the interface region is limited since they would have to pass through membranes of the wrong selectivity. The salt consequently builds up at the interface and results in a low resistance in this region. When the orientation of the membrane is reversed as shown in FIG. 2 and a current is passed, salt from the interface is transported to the external solutions leaving only $H^+$ and $OH^-$ ions from the dissociation of water to carry the current. In this mode the resistance of the interface can become high since water has a low conductivity.

FIG. 2 illustrates the water splitting capacity of the bipolar membrane. In the interface is made very thin, then even though only $H^+$ and $OH^-$ ions may be present the resistance of the layer can be small and the membrane may be used to generate acid and base.

FIG. 3 shows the cell used for determining the current efficiency of a bipolar membrane. B1 and B2 are bipolar films, C1 and C2 are Nafion cation exchange films. Chamber CR1 contained 1M $H_2SO_4$, chambers CR2 and CR4 an NaOH solution and chambers CR3 and CR5 an HCl solution. The acid and alkali solutions were of equal molarity, usually 2 molar.

Figure 1:
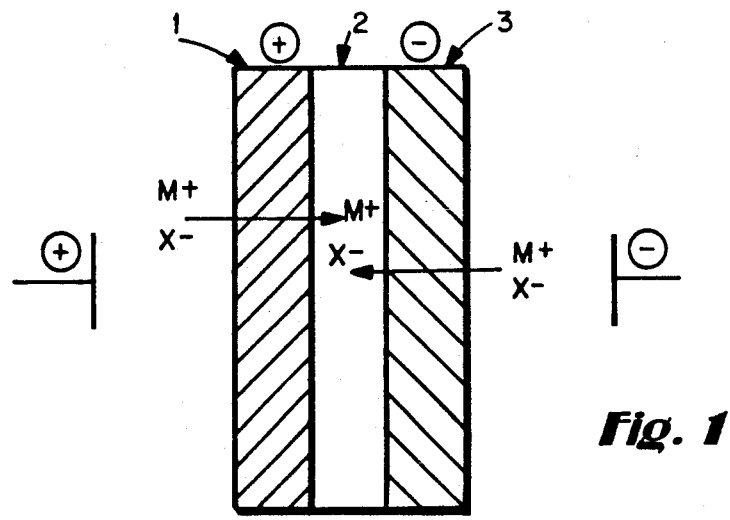
FIG. 1 is a schematic representation of a bipolar membrane according to the present invention.
Figure 2:
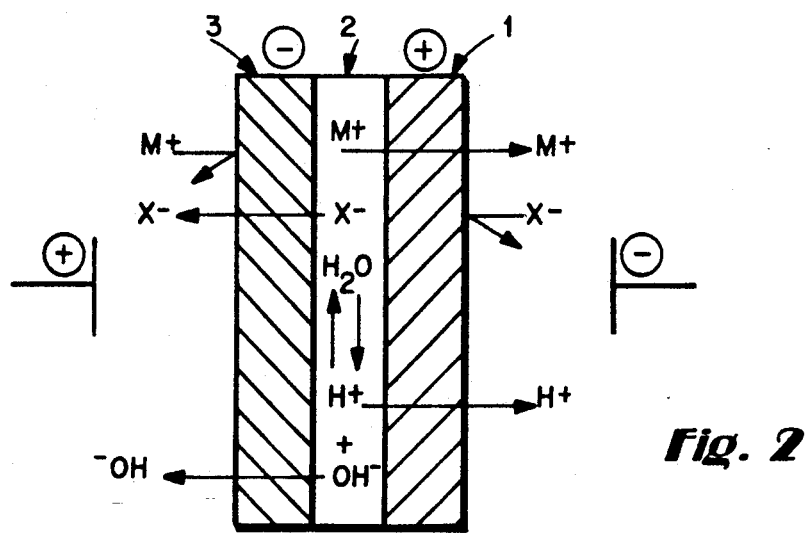
FIG. 2 is a schematic representation of a bipolar membrane electrodialysis cell for generating an acid and a base from a salt solution.
Figure 3:
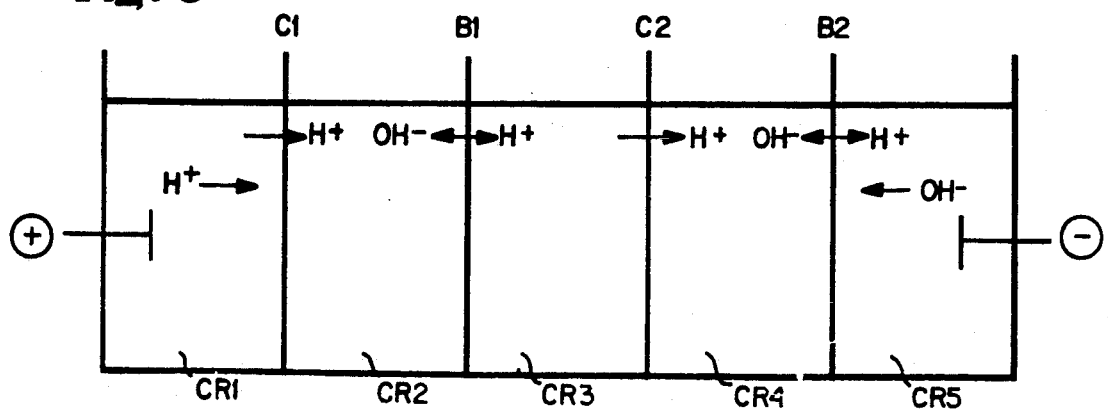
FIG. 3 is a schematic representation of the electrodialysis cell used for determining the current efficiency of a bipolar membrane.

During current flow, protons flow into chamber CR5 from the water splitting bipolar membrane B2 while hydroxyl ions are generated in the chamber at the cathode. If the water splitting current efficiency of the bipolar membrane were 100%, then the pH of the chamber would be essentially constant.

In the case of the alkali containing chamber CR4, hydroxyl ions flow into the compartment from the bipolar membrane and protons, which originate in the acid chamber CR3, from the cation exchange membrane. The only other ion which can carry current across C2 are hydroxyl ions from CR4, sodium ions in chamber CR4 and chloride ions in chamber CR3 being precluded from doing so by the direction of the electric field. Thus if the transport number of protons across C2 is less than unity, the difference is due to a flow of hydroxyl ions in the opposite direction. It follows that if the water splitting current efficiency of the bipolar membrane is 100% then the pH of chamber CR4 should be essentially constant during current flow.

Similar arguments can be adduced to show that if the water splitting current efficiency of the bipolar membrane B1 is 100%, then the pH's of chambers CR2 and CR3 should be essentially constant during current flow. The water splitting current efficiency of B1 (and B2), i.e. the fraction of the total current carried by $H^+$ or $OH^-$ ions in the film, was estimated from the pH changes which occurred in chambers CR2 and CR3 (CR4 and CR5) during current flow, taking account of volume flow of water through the membrane.

MODES FOR CARRYING OUT THE INVENTION

Example 1

Negev Institute quaternary ammonium anion and sulfonic acid cation exchange membranes were immersed for five minutes in a 7% (W/V) solution of chromium chloride in 2N Sodium hydroxide at 70° C. The membranes were then washed and pressed together under heat to form a bipolar membrane. The potential difference across the bipolar membrane was 1.0 volts when it separated 1M KCl solutions and the current was 100 mA cm$^2$. The current efficiency for acid base production by the film exceeded 80%. By comparison the potential difference across a bipolar membrane formed from untreated Negev Institute anion and cation exchange membranes at the same current and electrolyte concentrations was 3.0 volts.

Example 2

Negev Institute quaternary ammonium anion and sulfonic acid cation exchange membranes were immersed for five minutes in a 5% (W/V) solution of cerric sulphate in 1N sodium hydroxide at 70° C. The membranes were then washed and pressed together to form a bipolar membrane. The potential difference across the bipolar membrane was 1.0 volts when it separated 1M KCl solutions and the current was 100 mA cm$^{-2}$. The current efficiency for acid base production by the film exceeded 80%. By comparison the potential difference across a bipolar membrane formed from untreated Negev Institute anion and cation exchange membranes at the same current and electrolyte concentrations was 3.0 volts.

Example 3

Negev Institute quaternary ammonium anion and sulfonic acid cation exchange membranes were immersed for five minutes in a 7% (W/V) solution of stannous chloride in 2N sodium hydroxide at 70° C. The membranes were then washed and pressed together to form a bipolar membrane. The potential difference across the bipolar membrane was 1.1 volts when it separated 1M KCl solutions and the current was 100 mA cm$^{-2}$. The current efficiency for acid base production by the film exceeded 80%. By comparison the potential difference across a bipolar membrane formed from untreated Negev Institute anion and cation exchange membranes at the same current and electrolyte concentrations was 3.0 volts.

Example 4

Raipore 1035 and 1010 anion and cation exchange membranes were immersed for 20 minutes in a 5% (W/V) solution of ruthenium chloride in 1N NaOH at 70° C. The membranes were then washed and pressed together to form a bipolar membrane. The potential difference across the bipolar membrane was 0.9 volts for several weeks, which was the duration of the experiment, when it separated 2N HCl and 2N NaOH solutions and the current was 100 mA cm$^{-2}$. The current efficiency for acid base production by the film exceeded 85%. By comparison the potential difference across a bipolar membrane formed from untreated Raipore anion and cation exchange membranes at the same current and electrolyte concentrations was 2.5 volts.

Example 5

Negev Institute quaternary ammonium anion and sulfonic acid cation exchange membranes were immersed for five minutes in a 5% solution of zirconium chloride in 2N sodium hydroxide at 70° C. The membranes were then washed and pressed together to form a bipolar membrane. The potential difference across the bipolar membrane was 1.0 volts when it separated 1M KCl solutions and the current was 100 mA cm$^{-2}$. The current efficiency for acid base production by the film exceeded 80%. By comparison the potential difference across a bipolar membrane formed from untreated Negev Institute anion and cation exchange membranes at the same current and electrolyte concentrations was 3.0 volts.

Example 6

Negev Institute quaternary ammonium anion and sulfonic acid cation exchange membranes were immersed for fifteen minutes in a 7% solution of nickel chloride in 2N sodium hydroxide at 60°. The membranes were then washed and pressed together to form a bipolar membrane. The potential difference across the bipolar membrane was 1.1 volts when it separated 1M KCl solutions and the current was 100 mA cm$^{-2}$. The current efficiency for acid base production by the film exceeded 85%. By comparison the potential difference across a bipolar membrane formed from untreated Negev Institute anion and cation exchange membranes at the same current and electrolyte concentrations was 3.0 volts.

Example 7

A Negev Institute quaternary ammonium anion exchange membrane was immersed for ten minutes in a 5% (W/V) solution of chromium chloride in 2N NaOH at 70° C. The membrane was then washed and pressed against an Asahi Chemicals K101 cation exchange membrane to form a bipolar membrane. The potential difference across the bipolar membrane was 1.4 volts when it separated 1M KCl solutions and the current was 100 mA cm$^{-2}$. The current efficiency for acid base production by the film exceeded 80%. By comparison the potential difference across the bipolar membrane formed from untreated Negev Institute anion and Asachi Chemicals cation exchange membranes at the same current and electrolyte concentrations was 6 volts.

Example 8

Raipore R-1010 and R-1035 cation and anion exchange membranes were immersed for 20 minutes in a 7% (W/V) solution of chromic chloride in 2N NaOH at 100° C. The membranes were then washed clean and pressed together to form a bipolar film. The potential difference across the bipolar film was 0.9 V when it separated 2N HCl and 2N NaOH solutions and the current was 100 mA cm$^{-2}$. The current efficiency for acid base product ion in the bipolar film exceeded 85%. The properties of the film appeared constant for the duration of the experiment which was four months. By comparison the potential difference across the bipolar film formed from untreated R-1010 and R01035 membranes exceeded 2.5 V.

Example 9

Negev Institute quaternary ammonium group anion and sulfonic acid group cation exchange membranes were immersed for five minutes in a 7% (W/V) solution of chromic chloride in 2N NaOH at 100° C. The membranes were then washed clean and pressed together to form a bipolar film. The potential difference across the bipolar film was 1.1 V when it separated 2N HCl and 2N NaOH solutions and the current was 100 mA cm$^{-2}$. The current efficiency for acid base production in the bipolar film was 68%. The properties of the film appeared constant for the duration of the experiment which was three weeks. By comparison the potential difference across the bipolar film formed from untreated monopolar membranes for the same current and electrolyte concentrations was 4.5 V.

Example 10

Raipore R-1010 and R-4030 cation and anion exchange 1 ml and 2 ml thick membranes were immersed in a 1 molar chromium chloride solution, at room temperature, for one hour. The membranes were then washed with distilled water and entered wet into a polyethylene bag. The bag was then sealed.

Eight weeks later the membranes were removed from the bag, pressed together to form a bipolar film and then introduced into a multichamber electrodialysis cell. A solution of 2N NaOH at 75° C. was then introduced into the chambers adjacent to the membrane for fifteen minutes. The hot 2N NaOH solution was then discarded and replaced by a 2N NaOH solution on the anolyte side of the film and a 2N HCl solution on the catholyte side of the film, at room temperature. The potential difference across the bipolar film was 1.1 V when the current was 100 mA cm$^{-2}$. The current efficiency for water splitting in the film exceeded 85%. The properties of the film appeared constant for the duration of the experiment which lasted for four weeks. By comparison the potential difference across the bipolar film formed from untreated R-1010 and R-4030 membranes under the same efficiency operating conditions exceeded 2.5 V.

Example 11

Raipore R-1010 and R-1030 cation and anion exchange 1 ml thick membranes were immersed in a 10% (W/V) solution of ruthenium (III) chloride at room temperature overnight. The membranes were then washed clean, pressed together to form a bipolar film and then introduced into a multichamber electrodialysis cell. A solution of 0.5N NaOH at 75° C. was then introduced into the chambers adjacent to the membrane for thirty minutes. The 0.5N NaOH solution was then discarded and replaced by a 2N NaOH solution on the anolyte side of the film and a 2N HCl solution on the catholyte side of the film at room temperature. The potential difference across the bipolar film was 1.0 V when the current was 100 MA cm$^{-2}$. The current efficiency for water splitting in the film exceed 85%. The properties of the film appeared constant for the duration of the experiment which lasted for 100 hours. By comparison the potential difference across the bipolar film formed from untreated R-1010 and R-1030 membranes under the same operating conditions exceeded 2.5 V.

Example 12

Negev Institute quaternary ammonium anion and sulfonic acid cation exchange membrances were immersed for thirty minutes in a 1 molar solution of chromium chloride. The membranes were then washed, pressed together to form a bipolar membrane, and then introduced into a multichamber electrodialysis cell. A solution of 2N NaOH at 75° C. was then introduced into the chambers adjacent to the membrane for thirty minutes. The NaOH was then discarded and replaced by 1M KCl solutions, at room temperature. The potential difference across the bipolar membrane was 1.4 volts when it separated 1M KCl solutions and the current was 50 mA cm$^{-2}$. The current efficiency for acid base production by the film exceeded 80%. By comparison the potential difference across a bipolar membrane formed from untreated Negev Institute anion and cation exchange membranes at the same current and electrolyte concentrations was 2.2 volts.

Example 13

Raipore R-1010 and R-1030 cation and anion exchange 1 ml thick membranes were immersed in a 10% (w/V) solution of ferrous chloride at room temperature for one hour. The membranes were then washed with distilled water, pressed together to form a bipolar membrane, and introduced into a multichamber electrodialysis cell. A solution of 2N NaOH at 70° C. was introduced into the chambers adjacent to the membrane for thirty minutes. The 2N NaOH solution was then discarded and replaced by a 2N NaOH solution on the anolyte side of the film and a 2N HCl solution on the catholyte side of the film, at room temperature. The potential difference across the bipolar film was 1.1 V when the current was 100 mA cm$^{-2}$. The current efficiency for water splitting in the film exceeded 85%. The properties of the film appeared constant for the duration of the experiment which lasted for 4 hours. By comparison the potential difference across the bipolar film formed from untreated R-1010 and R-1030 membranes under the same operating conditions exceeded 2.5 V.

Example 14

Raipore R-1010 and R-1030 cation and anion exchange 1 ml thick membranes were immersed in a 10% (w/V) solution of stannous chloride for 1 hour. The membranes were then washed with distilled water, pressed together to form a bipolar membrane and introduced into a multichamber electrodialysis cell. A solution of 2N NaOH at 75° C. was then introduced into the chambers adjacent to the membrane for fifteen minutes. The 2N NaOH solution was then discarded and replaced by 1M KCl solution, at room temperature. The potential difference across the bipolar film was 1.1 V when the current was 100 mA cm$^{-2}$. The current efficiency for water splitting in the film exceeded 85%. By comparison the potential difference across the bipolar film formed from untreated R-1010 and R-1030 membranes under the same operating conditions exceeded at 2.5 V.

Example 15

Asahi Chemicals K101 and Raipore R-1030 cation and anion exchange membranes were immersed in a 1 molar solution of chromium chloride for 1 hour. The membranes were then washed with distilled water, pressed together to form a bipolar membrane and then introduced into a multichamber electrodialysis cell. A solution of 2N NaOH at 75° C. was then introduced into the chambers adjacent to the membrane for twenty minutes. The 2N NaOH solution was discarded and replaced by 1M KCl, at room temperature. The potential difference across the bipolar film was 1.8 V when the current was 50 mA cm$^{-2}$. The current efficiency for water splitting in the film exceeded 85%. By comparison the potential difference across the bipolar film formed from untreated K101 and R-1030 membranes under the same operating conditions exceeded 8 V.

Example 16

Raipore R-1010 and R-1030 cation and anion exchange films were immersed in boiling 0.01N NaOH solution for 5 minutes. Chromic chloride was then added to the solution to a concentration of 7% (W/V) and the membranes were left in the boiling mixture for a further 10 minutes. The films were then washed clean and pressed together to form a bipolar membrane. The potential difference across the bipolar membrane remained constant at 1.0 V and the current efficiency for acid base production exceeded 85%, for 5 days, which was the duration of the experiment, when it separated 2N HCl and 2N NaOH solutions and the current was 100 mA cm$^{-2}$.

Example 17

Raipore R-1010 and R-1030 cation and anion exchange films were immersed in a 1M CrCl$_3$ solution for 12 hours at room temperature. The films were then immersed in 1M NaOH solution, preheated to 80° C., for 40 minutes. The films were then washed clean and pressed together to form a bipolar membrane. The potential difference across the bipolar membrane was 1.1 V for two weeks, which was the duration of the experiment, when it separated 1M HCl and 1M NaOH solutions and the current was 100 mA cm$^{-2}$. The current efficiency for acid base production by the membrane was 97%.

I claim:

1. A bipolar membrane comprising conjoined, modified anion and cation exchange membranes, said modified membranes comprising anion and cation exchange membranes modified by
    (a) treatment with an aqueous solution of at least one monovalent or higher oxidation state cation, excluding sodium and potassium, prior to being conjoined, and
    (b) treatment of at least one face of one of the anion and cation exchange membranes with an aqueous alkaline solution, at least one of said aqueous solution and of said aqueous alkaline solution being hot, said bipolar membrane when tested in an electrodialysis cell containing 2N sodium hydroxide and 2N hydrochloric acid exhibiting a potential difference across said membrane substantially lower than that exhibited by a bipolar membrane formed from unmodified anion and cation exchange membranes for a period of at least 100 hours.

2. A bipolar membrane as in claim 1, wherein the membranes are treated, prior to conjoining, by immersion in an aqueous solution of at least one monovalent or higher oxidation state cation, excluding potassium and sodium.

3. A bipolar membrane as in claim 2, wherein the membranes are conjoined prior to treatment with the aqueous alkaline solution.

4. A bipolar membrane as in claim 2, wherein the membranes are treated with the aqueous alkaline solution prior to conjoining.

5. A bipolar membrane as in claim 4, wherein the aqueous alkaline solution includes the at least one monovalent or higher oxidation state cation, excluding sodium and potassium.

6. A bipolar membrane as in claim 5, wherein both membranes are treated by immersion in the aqueous alkaline solution.

7. A bipolar membrane as in claim 6, wherein the aqueous alkaline solution is at a temperature between about 70° C. and about 100° C.

8. A bipolar membrane as in claim 4, wherein prior to conjoining, both membranes are treated by immersion in the hot aqueous state cation, excluding sodium and potassium, and then treated by immersion in the hot aqueous alkaline solution.

9. A bipolar membrane as in claim 8, wherein treatment with the aqueous alkaline solution consists of contacting a membrane face with said solution.

10. A bipolar membrane as in claim 9, wherein both of the membrane faces are contacted with the aqueous alkaline solution.

11. A bipolar membrane as in claim 10, wherein the aqueous alkaline solution is at a temperature of about 75° C.

12. A bipolar membrane as in claim 2, wherein the at least one cation is included as a salt in a concentration of from 5 to 15% w/v.

13. A bipolar membrane as in claim 12, wherein the at least one cation is selected from the group consisting of $Cr^{3+}$, $Ru^{3+}$, $Ce^{3+}$, $Ni^{2+}$, $Zr^{4+}$, $In^{3+}$, $Sn^{2+}$ and $Fe^{2+}$.

14. A bipolar membrane as in claim 13, wherein the salt is selected from the group consisting of chromic nitrate, chromic chloride, ruthenium trichloride, indium sulphate, cerrous sulphate, thorium nitrate and zirconium chloride.

15. A bipolar membrane as in claim 2, wherein the aqueous alkaline solution concentration is from 0.2 to 2.0 molar.

16. A bipolar membrane as in claim 2, wherein the anion and cation exchange membranes include quaternary ammonium and sulphonic acid groups.

17. A method for the preparation of a bipolar membrane from modified anion and cation exchange membranes which bipolar membrane when tested in an electrodialysis cell containing 2N hydrochloric acid and 2N hydroxide exhibits a potential difference across said membrane substantially lower than that exhibited by a bipolar membrane formed from unmodified anion and cation exchange membranes for a period of at least 100 hours, said method comprising modifying anion and cation exchange membranes by
    (a) treating an anion exchange membrane and a cation exchange membrane with an aqueous solution of a salt, said salt yielding in the solution at least one monovalent or higher oxidation state cation, excluding sodium and potassium;
    (b) conjoining the treated anion and cation exchange membranes; and
    (c) treating at least one face of the conjoined membranes with an aqueous alkaline solution, to give said bipolar membrane, at least one of said aqueous salt solution and said aqueous alkaline solution being hot, to thereby obtain said membrane.

18. A method as in claim 17, wherein the treatment comprises immersion of the anion exchange membrane in the aqueous salt solution.

19. A method as in claim 17, wherein the treatment with the aqueous alkaline solution consists of contacting a membrane face with said solution.

20. A method as in claim 19, wherein both faces of the bipolar membrane are contacted with the aqueous alkaline solution.

21. A method as in claim 17, wherein the aqueous alkaline solution is in a concentration of 0.2 to 2.0 molar.

22. A method as in claim 21, wherein the alkaline solution contacts the membrane for from 15 to 30 minutes.

23. A method as in claim 22, wherein the alkaline solution is at a temperature of about 75° C.

24. A method as in claim 17, wherein the anion and cation exchange membranes are treated by immersion in the aqueous salt solution.

25. A method as in claim 17, wherein the salt is in a concentration of from 5 to 15% w/v.

26. A method as in claim 25, wherein the salt is selected from the group consisting of chromic nitrate, chromic chloride, ruthenium trichloride, ferrous chloride, indium sulphate, cerrous sulphate, thorium nitrate and zirconium chloride.

27. A method as in claim 17, wherein the membrane are conjoined by pressing together at a temperature below the onset of deformation or degradation of the membranes.

28. A method for the preparation of a bipolar membrane from modified anion and cation exchange membranes which bipolar membrane when tested in an electrodialysis cell containing 2N hydrochloric acid and 2N sodium hydroxide exhibits a potential difference across said membrane substantially lower than that exhibited by a bipolar membrane formed from unmodified anion and cation exchange membranes for a period of at least 100 hours, said method comprising modifying anion and cation exchange membranes by treating an anion exchange and a cation exchange membrane with a hot aqueous alkaline solution of a salt, said salt yielding in the solution at least one monovalent or higher oxidation state cation, excluding sodium and potassium; and then conjoining the modified membranes to give said bipolar membrane.

29. A method as in claim 28, wherein the alkali is in a concentration of from 0.2 to 2.0 molar.

30. A method as in claim 28, wherein the salt is in a concentration of from 5 to 15% w/v.

31. A method as in claim 30, wherein the salt is selected from the group consisting of chromic nitrate, chromic chloride, ruthenium trichloride, ferrous chloride, indium sulphate, cerrous sulphate, thorium nitrate and zirconium chloride.

32. A method as in claim 28, wherein the membranes are treated by immersion in the aqueous alkaline salt solution.

33. A method a in claim 32, wherein the solution containing the membranes is at a temperature of between about 70° C. and about 100° C.

34. A method as in claim 28, wherein the membranes are washed prior to conjoining.

35. A method as in claim 28, wherein the membranes are conjoined by pressing together at a temperature below the onset of deformation or degradation of the membranes.

* * * * *